(12) United States Patent
To

(10) Patent No.: US 10,932,557 B2
(45) Date of Patent: Mar. 2, 2021

(54) DENTAL CLEANING TOOL WITH HANDLE SHIELD

(71) Applicant: World Wide Daily Holdings Company Limited, Hong Kong (CN)

(72) Inventor: Chun Yuen To, Hong Kong (CN)

(73) Assignee: WORLD WIDE DAILY HOLDINGS COMPANY LIMITED, Hong Kong (CN)

( * ) Notice: Subject to any disclaimer, the term of this patent is extended or adjusted under 35 U.S.C. 154(b) by 264 days.

(21) Appl. No.: 16/017,209

(22) Filed: Jun. 25, 2018

(65) Prior Publication Data

US 2019/0082821 A1 Mar. 21, 2019

Related U.S. Application Data

(63) Continuation of application No. PCT/CN2017/102245, filed on Sep. 19, 2017.

(51) Int. Cl.
| | |
|---|---|
| *A61C 15/00* | (2006.01) |
| *A46B 15/00* | (2006.01) |
| *A61C 15/04* | (2006.01) |
| *A61C 15/02* | (2006.01) |

(52) U.S. Cl.
CPC .......... *A46B 15/0073* (2013.01); *A61C 15/02* (2013.01); *A61C 15/046* (2013.01)

(58) Field of Classification Search
CPC . A46B 15/0073; A46B 15/0071; A61C 15/02; A61C 15/046; A61C 15/04
USPC .................................. 132/328, 321; 433/141
See application file for complete search history.

(56) References Cited

U.S. PATENT DOCUMENTS

| | | | |
|---|---|---|---|
| 435,350 | A | 8/1890 | Oehlecker |
| 790,432 | A | 5/1905 | Heilrath |
| 867,264 | A | 10/1907 | Evans |
| 869,175 | A | 10/1907 | Gorut |
| 1,076,010 | A | 10/1913 | Cameron |

(Continued)

FOREIGN PATENT DOCUMENTS

| | | |
|---|---|---|
| AU | 323344 D | 12/2008 |
| AU | 2004200725 B9 | 1/2010 |

(Continued)

OTHER PUBLICATIONS

Extended Search Report and Written Opinion prepared by the International Searching Authority regarding Chinese Patent Serial No. PCT/CN2017/102245 dated Jun. 22, 2018.

*Primary Examiner* — Rachel R Steitz
(74) *Attorney, Agent, or Firm* — Armstrong Teasdale LLP

(57) ABSTRACT

A dental cleaning tool includes a body portion defining a longitudinal axis of the dental cleaning tool. The body portion extends from a first end to a second end along the longitudinal axis. The body portion includes a floss assembly formed at the first end of the body portion, a toothpick member formed at the second end of the body portion, and a handle portion extending between the floss assembly and the toothpick member. The handle portion includes a receptacle. The tool further includes at least one secondary cleaning tool coupled to the body portion. The at least one secondary cleaning tool is rotatable relative to the body portion for selectively positioning the at least one secondary cleaning tool between a stowed position, within the receptacle, and a deployed position.

20 Claims, 14 Drawing Sheets

(56) References Cited

U.S. PATENT DOCUMENTS

| | | | |
|---|---|---|---|
| 1,414,604 A * | 5/1922 | Thum | A61C 15/046 132/323 |
| 1,487,075 A | 3/1924 | Olson | |
| 1,678,609 A * | 7/1928 | Spanier | A61C 15/02 132/328 |
| 1,816,092 A | 7/1931 | Schmitter | |
| 2,765,799 A | 10/1956 | Ritter | |
| 4,296,518 A * | 10/1981 | Furrier | A46B 15/0055 15/110 |
| D283,761 S | 5/1986 | Chen | |
| 5,046,212 A | 9/1991 | O'Conke | |
| 5,409,022 A | 4/1995 | Elias | |
| D398,076 S | 9/1998 | Hafkin | |
| 5,865,552 A | 2/1999 | Manno | |
| D493,575 S | 7/2004 | Gwen | |
| 6,957,467 B2 | 10/2005 | Cabedo Deslierres | |
| 8,555,901 B2 | 10/2013 | Misner | |
| D794,792 S | 8/2017 | Wolfe | |
| 9,848,966 B2 | 12/2017 | Chodorow et al. | |
| 2002/0073496 A1 | 6/2002 | Kim | |
| 2005/0048438 A1* | 3/2005 | Gwen | A61B 17/244 433/141 |
| 2005/0048439 A1* | 3/2005 | Gwen | A61B 17/244 433/141 |
| 2015/0305840 A1 | 10/2015 | Chodorow et al. | |
| 2016/0067021 A1* | 3/2016 | Zwimpfer | A61C 15/02 132/323 |
| 2016/0113744 A1* | 4/2016 | Chodorow | A61C 15/046 132/323 |
| 2019/0075919 A1* | 3/2019 | Zwimpfer | A46B 5/021 |
| 2019/0082821 A1* | 3/2019 | To | A61C 15/02 |
| 2019/0083213 A1* | 3/2019 | To | A61C 15/02 |
| 2019/0105138 A1* | 4/2019 | To | A61C 15/02 |
| 2019/0209277 A1* | 7/2019 | To | A61C 15/02 |
| 2019/0239990 A1* | 8/2019 | To | A61C 15/046 |
| 2020/0030066 A1* | 1/2020 | To | A46B 15/0069 |

FOREIGN PATENT DOCUMENTS

| | | | | |
|---|---|---|---|---|
| AU | 2010100463 A4 | 6/2010 | | |
| AU | 334310 D | 12/2010 | | |
| AU | 2011205168 A1 | 2/2012 | | |
| AU | 2016101078 A4 | 8/2016 | | |
| AU | 201711047 D | 11/2017 | | |
| AU | 201711734 D | 11/2017 | | |
| AU | 201714880 D | 3/2018 | | |
| CN | 1213703 C | 8/2005 | | |
| CN | 201558187 U | 8/2010 | | |
| CN | 201631405 U | 11/2010 | | |
| CN | 201798816 U | 4/2011 | | |
| CN | 201840538 U | 5/2011 | | |
| CN | 201861788 U | 6/2011 | | |
| CN | 201977044 U | 9/2011 | | |
| CN | 202223372 U | 5/2012 | | |
| CN | 202235732 U | 5/2012 | | |
| CN | 202605043 U | 12/2012 | | |
| CN | 102429734 B | 6/2013 | | |
| CN | 102379749 B | 7/2013 | | |
| CN | 203074913 U | 7/2013 | | |
| CN | 203107320 U | 8/2013 | | |
| CN | 203234856 U | 10/2013 | | |
| CN | 203280521 U | 11/2013 | | |
| CN | 203280522 U | 11/2013 | | |
| CN | 203303179 U | 11/2013 | | |
| CN | 203408115 U | 1/2014 | | |
| CN | 203852442 U | 10/2014 | | |
| CN | 203915110 U | 11/2014 | | |
| CN | 104224360 A | 12/2014 | | |
| CN | 204092249 U | 1/2015 | | |
| CN | 204106235 U | 1/2015 | | |
| CN | 104414762 A | 3/2015 | | |
| CN | 204233237 U | 4/2015 | | |
| CN | 204364153 U | 6/2015 | | |
| CN | 204379466 U | 6/2015 | | |
| CN | 204379467 U | 6/2015 | | |
| CN | 204379468 U | 6/2015 | | |
| CN | 204562433 U | 8/2015 | | |
| CN | 204581562 U | 8/2015 | | |
| CN | 204636592 U | 9/2015 | | |
| CN | 204744466 U | 11/2015 | | |
| CN | 204890227 U | 12/2015 | | |
| CN | 204890228 U | 12/2015 | | |
| CN | 103505296 B | 1/2016 | | |
| CN | 204971667 U | 1/2016 | | |
| CN | 102949246 B | 2/2016 | | |
| CN | 205031381 U | 2/2016 | | |
| CN | 104546177 B | 5/2016 | | |
| CN | 205339184 U | 6/2016 | | |
| CN | 105769365 A | 7/2016 | | |
| CN | 104434330 B | 8/2016 | | |
| CN | 205659010 U | 10/2016 | | |
| CN | 20583160 U | 11/2016 | | |
| CN | 106137426 A | 11/2016 | | |
| CN | 106137428 A | 11/2016 | | |
| CN | 106175953 A | 12/2016 | | |
| CN | 106308960 A | 1/2017 | | |
| CN | 205963317 U | 2/2017 | | |
| CN | 104970896 B | 3/2017 | | |
| CN | 106491227 A | 3/2017 | | |
| CN | 106579979 A | 4/2017 | | |
| CN | 106620891 A | 5/2017 | | |
| CN | 106725949 A | 5/2017 | | |
| CN | 103340695 B | 6/2017 | | |
| CN | 206275745 U | 6/2017 | | |
| CN | 206295390 U | 7/2017 | | |
| CN | 206365942 U | 8/2017 | | |
| CN | 206380902 U | 8/2017 | | |
| DE | 19850325 A1 | 5/2000 | | |
| DE | 19850325 A1 * | 5/2000 | | A61C 15/02 |
| DE | 10054811 A1 | 5/2002 | | |
| DE | 10054811 A1 * | 5/2002 | | A46B 9/026 |
| DE | 102010055052 A1 | 6/2012 | | |
| DE | 102015001650 A1 | 8/2016 | | |
| EP | 2509469 A1 | 10/2012 | | |
| EP | 2807991 A1 | 12/2014 | | |
| EP | 2986248 A1 | 2/2016 | | |
| EP | 3117797 A1 | 1/2017 | | |
| JP | 07298924 A * | 11/1995 | | |
| JP | 7298924 A | 11/1995 | | |
| JP | H07298924 A | 11/1995 | | |
| JP | 2002336051 A | 11/2002 | | |
| JP | 2004216014 A | 8/2004 | | |
| JP | 3110869 U | 7/2005 | | |
| JP | 1310099 S | 8/2007 | | |
| JP | 3170171 U | 9/2011 | | |
| JP | 3186875 U | 10/2013 | | |
| JP | 2016041233 A | 3/2016 | | |
| WO | 2003043523 A1 | 5/2003 | | |
| WO | 2012116451 A1 | 9/2012 | | |
| WO | 2013091015 A1 | 6/2013 | | |
| WO | 2015116925 A2 | 8/2015 | | |
| WO | 2016087885 A1 | 6/2016 | | |
| WO | 2016154733 A1 | 10/2016 | | |
| WO | 2016174263 A1 | 11/2016 | | |
| WO | 2016199833 A1 | 12/2016 | | |
| WO | 2017021747 A1 | 2/2017 | | |
| WO | WO-2017021747 A1 * | 2/2017 | | A46B 9/00 |
| WO | 2017121234 A1 | 7/2017 | | |
| WO | 2017134656 A1 | 8/2017 | | |

* cited by examiner

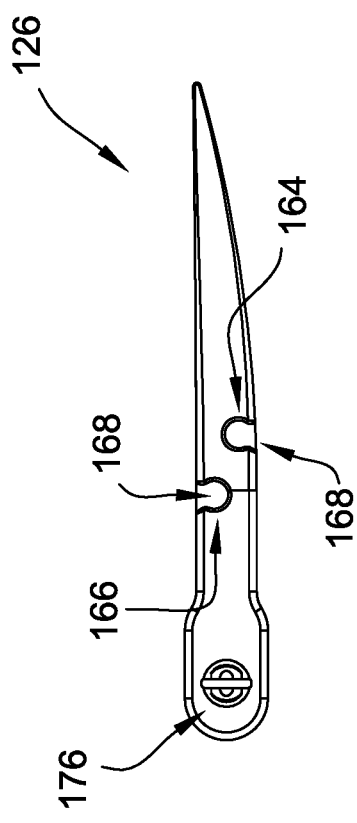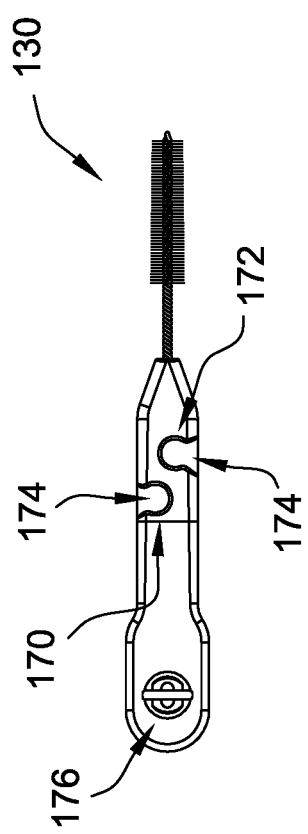

DENTAL CLEANING TOOL WITH HANDLE SHIELD

CROSS REFERENCE TO RELATED APPLICATIONS

This application is a continuation of International Patent Application No. PCT/CN2017/102245, filed Sep. 19, 2017, and is hereby incorporated by reference in its entirety.

FIELD

The field of this disclosure relates generally to dental cleaning tools and, more specifically, to a dental cleaning tool having a shield for selectively stowing at least one secondary cleaning tool therein, wherein the shield also functions as a handle for the tool.

BACKGROUND

Dental cleaning tools are used to remove food remnants and/or build-up from the surface of or between teeth. As a result, some known dental cleaning tools include a brush for cleaning the surface of teeth, and other known dental cleaning tools include floss and/or a pick for removing or loosening food remnants (or other debris) lodged between the user's teeth. Moreover, at least some known dental cleaning tools include a cleaning instrument that is moveable between a deployed position when in use and a stowed position when being stored within the tool. However, many known dental cleaning tools implement bulky and complex mechanical means for shielding the cleaning instrument when in the stowed position. In addition, the cleaning instrument may be an independent component separate from the dental cleaning tools such that the cleaning instrument may be lost when deployed from the dental cleaning tools.

As such, there is a need for a simple and cost effective dental cleaning tool having a cleaning instrument moveable between a deployed position and a stowed position within the tool, wherein the cleaning instrument is disposed within a slot and shielded by a portion of the dental cleaning tool.

BRIEF DESCRIPTION

In one aspect, a dental cleaning tool is provided. The tool generally comprises a body portion defining a longitudinal axis of the dental cleaning tool. The body portion extends from a first end to a second end along the longitudinal axis. The body portion includes a floss assembly formed at the first end of the body portion, a toothpick member formed at the second end of the body portion, and a handle portion extending between the floss assembly and the toothpick member. The handle portion includes a receptacle. The tool further includes at least one secondary cleaning tool coupled to the body portion. The at least one secondary cleaning tool is rotatable relative to the body portion for selectively positioning the at least one secondary cleaning tool between a stowed position, within the receptacle, and a deployed position.

In another aspect, a dental cleaning tool is provided. The tool generally comprises a body portion defining a longitudinal axis of the dental cleaning tool. The body portion extends from a first end to a second end along the longitudinal axis. The body portion includes a floss assembly formed at the first end of the body portion, a toothpick member formed at the second end of the body portion, and a handle portion extending between the floss assembly and the toothpick member. The handle portion includes a receptacle, and a spine member extends within an interior of the receptacle. The spine member terminates within the interior. The tool further includes at least one secondary cleaning tool coupled to the body portion. The at least one secondary cleaning tool is rotatable relative to the body portion for selectively positioning the at least one secondary cleaning tool between a stowed position, within the receptacle, and a deployed position.

In yet another aspect, a dental cleaning tool is provided. The tool generally comprises a body portion defining a longitudinal axis of the dental cleaning tool. The body portion extends from a first end to a second end along the longitudinal axis. The body portion includes a floss assembly formed at the first end of the body portion, a toothpick member formed at the second end of the body portion, and a handle portion extending between the floss assembly and the toothpick member. The handle portion includes a receptacle, and a spine member extends within an interior of the receptacle. The spine member is configured to partition the interior such that a first receiving slot and a second receiving slot are defined therein. The tool further includes at least one secondary cleaning tool coupled to the body portion. The at least one secondary cleaning tool is rotatable relative to the body portion for selectively positioning the at least one secondary cleaning tool between a stowed position, within at least one of the first receiving slot and the second receiving slot, and a deployed position.

BRIEF DESCRIPTION OF THE DRAWINGS

FIG. 6 is a side view of the first secondary cleaning tool of the dental cleaning tool;

FIG. 7 is side view of the secondary cleaning tool of the dental cleaning tool;

DETAILED DESCRIPTION OF THE DRAWINGS

Figure 1:
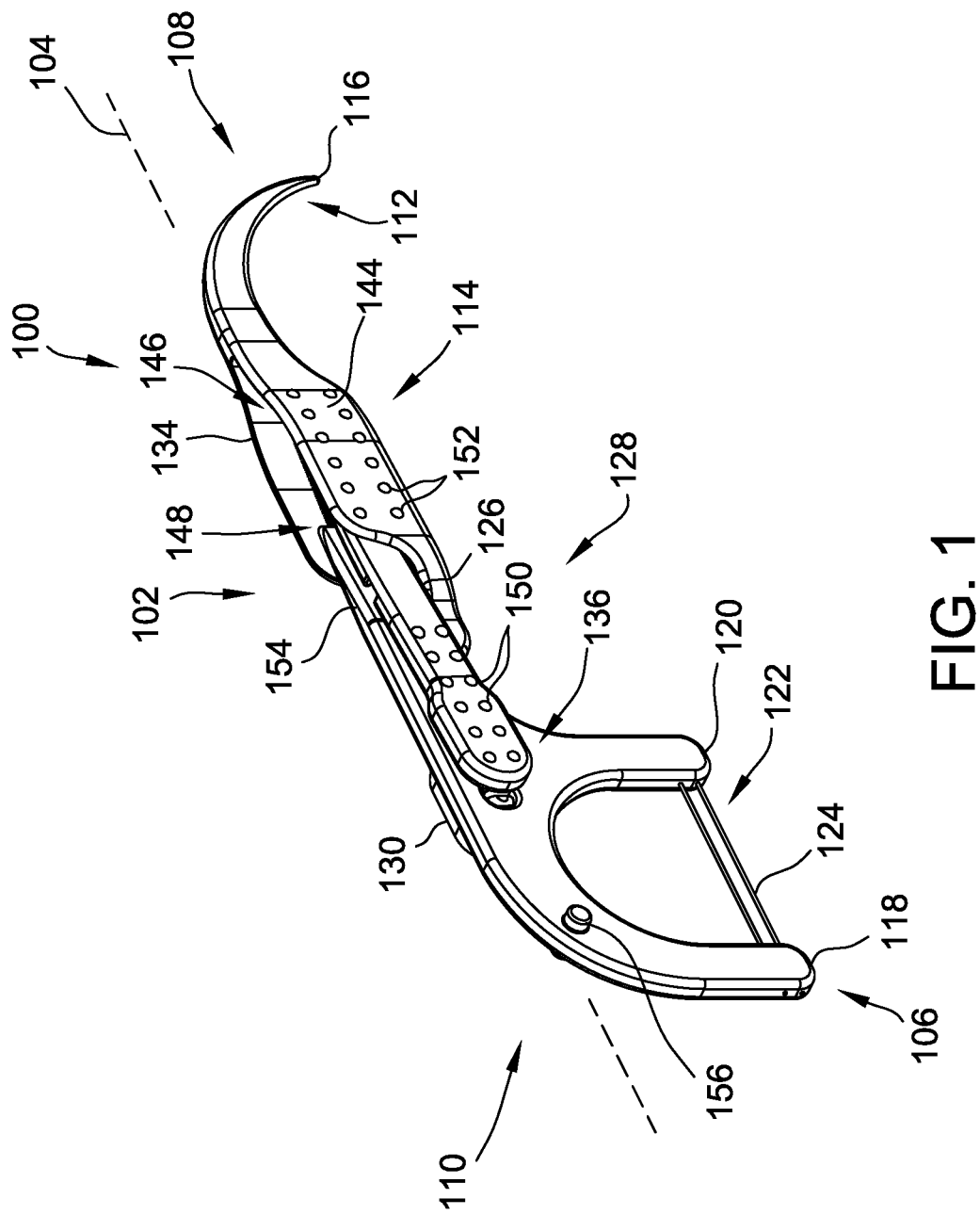
FIG. 1 is a perspective view of one suitable dental cleaning tool of the present disclosure, the dental cleaning tool have handle portion defining a shield, a first secondary cleaning tool, and second secondary cleaning tool, the first and second secondary cleaning tools being in a stowed position.

FIGS. 1-5 illustrate one suitable embodiment of a dental cleaning tool, indicated generally at 100, of the present disclosure. As illustrated herein, the dental cleaning tool 100 includes a body portion, indicated generally at 102, that defines a longitudinal axis 104 of the dental cleaning tool. The body portion 102 extends from a first end, indicated generally at 106, to a second end, indicated generally at 108, along the longitudinal axis 104. In addition, the body portion 102 includes a floss assembly, indicated generally at 110, formed at the first end 106 of the body portion 102, a toothpick member, indicated generally at 112, formed at the second end 108 of the body portion 102, and a handle portion, indicated generally at 114, extending between the floss assembly 110 and the toothpick member 112. In the exemplary embodiment, the body portion 102 is tapered such that the toothpick member 112 includes a pointed tip 116 at the second end 108 of the body portion 102. Moreover, the toothpick member 112 extends arcuately between the handle portion 114 and the pointed tip 116 relative to the longitudinal axis 104 of the body portion 102. The toothpick member 112 is configured to facilitate removing or loosening food remnants or other debris from hard-to-reach locations within the user's mouth (e.g., between user's teeth).

Figure 3:
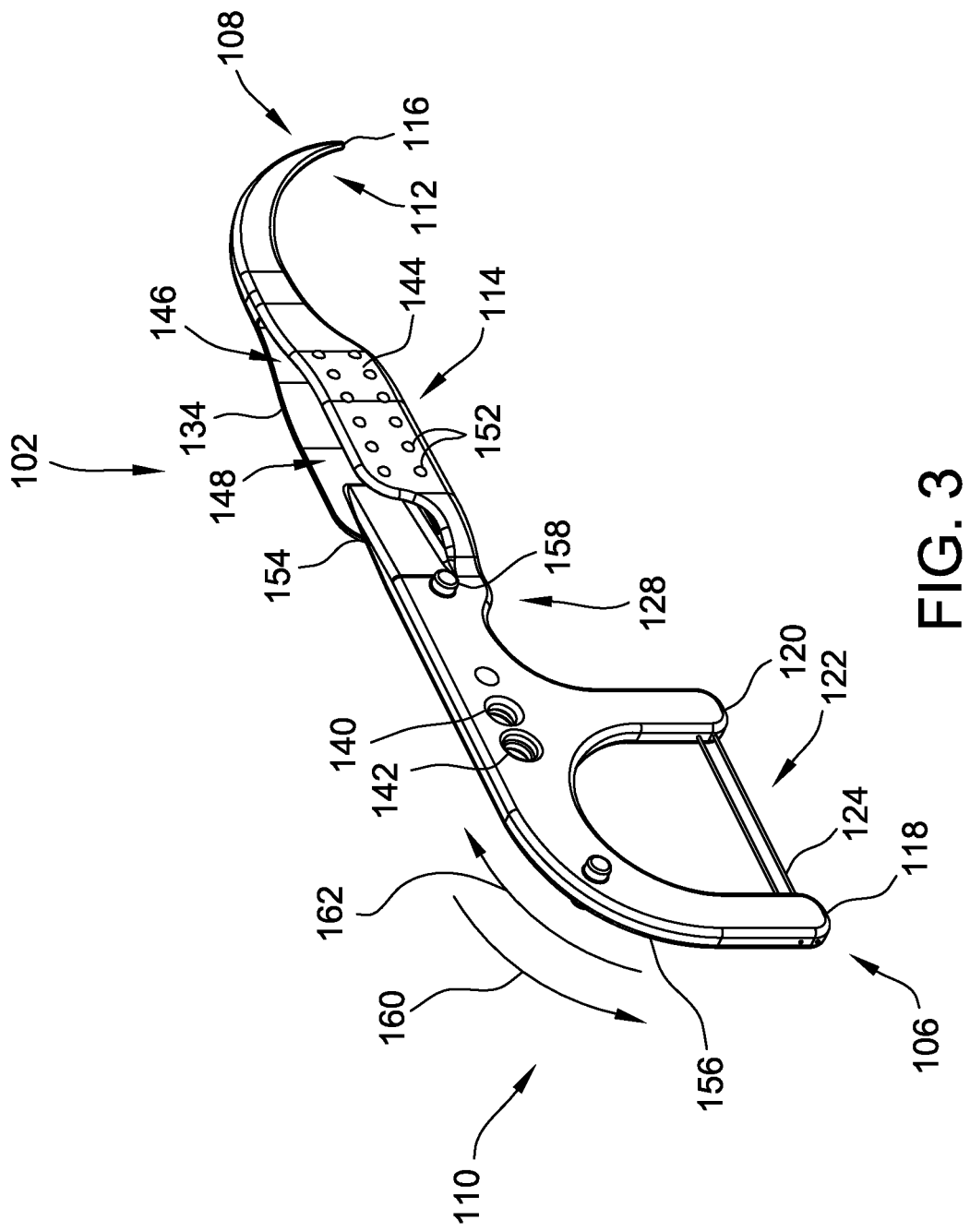
FIG. 3 is a perspective view of the dental cleaning tool similar to FIG. 1 but with the first and second cleaning tools removed therefrom.

As seen in FIGS. 1 and 3, the floss assembly 110 includes a first arm 118 and a second arm 120 extending substantially perpendicularly relative to the longitudinal axis 104. The first arm 118 and the second arm 120 are generally parallel to each other and spaced apart by a distance such that a gap 122 is defined therebetween. In the illustrated embodiment, the dental cleaning tool 100 includes a length of floss 124 that spans the gap 122 and that is coupled between the first arm 118 and the second arm 120. In one suitable embodiment, the floss 124 is held in tension across the gap 122 to facilitate removing or loosening food remnants or other debris when inserted between a user's teeth. In the illustrated embodiment, the floss assembly 110 includes two strands of floss 124 spanning the gap 122 between the first and second arms 118, 120 in generally parallel relationship with each other. It is understood, however, that the floss assembly 110 can include more or fewer stands of floss 124 without departing from some aspects of this disclosure.

Figure 2:
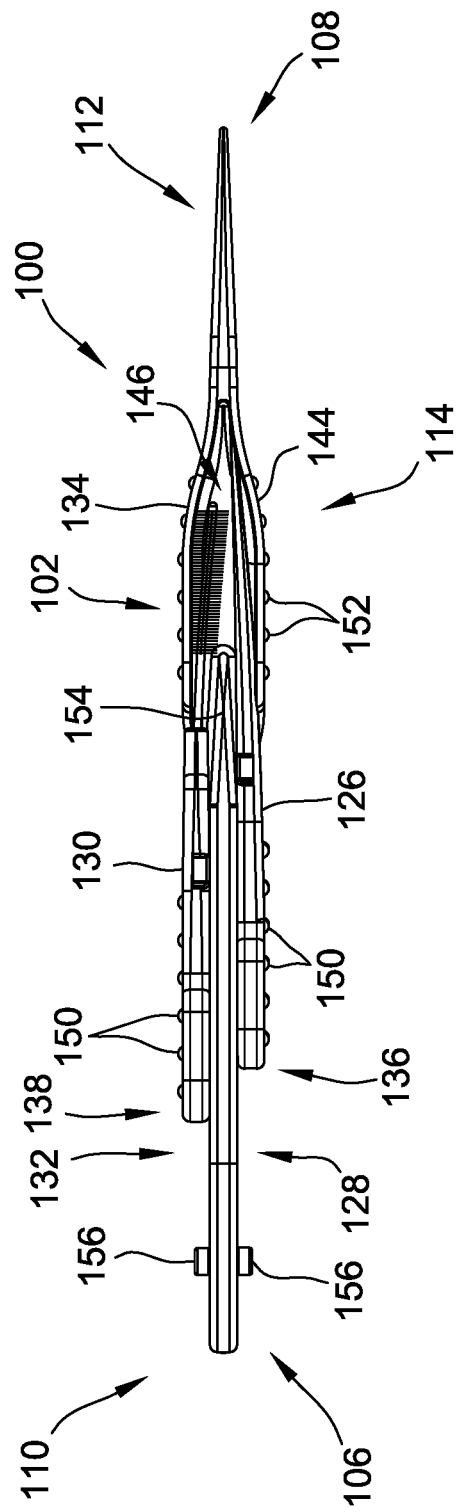
FIG. 2 is a top view of the dental cleaning tool shown in FIG. 1.

As seen in FIGS. 1 and 2, the dental cleaning tool 100 also includes at least one secondary cleaning tool coupled to the body portion 102. More specifically, the dental cleaning tool 100 illustrated in the accompanying drawings includes a first secondary cleaning tool 126 coupled on a first side, indicated generally at 128, of the body portion 102, and a second secondary cleaning tool 130 coupled on an opposite second side, indicated generally at 132, of the body portion 102. The first and second secondary cleaning tools 126, 130 can be any suitable dental cleaning instruments that enable the dental cleaning tool 100 to function as described herein. In one suitable embodiment, the first secondary cleaning tool 126 is a secondary toothpick member, and the second secondary cleaning tool 130 is a bristled cleaning member. In one embodiment, bristles of the bristled cleaning member are fabricated from nylon, and are spaced continuously along a length and a circumference of the tool 130 such that a cylindrical brush is defined at the end of the tool 130. Alternatively, the bristles of the bristled cleaning member are arranged in a series of rows, each extending along the length of the tool 130, and spaced equidistant from each other about the circumference of the tool 130. The first secondary cleaning tool 126 and the second secondary cleaning tool 130 are rotatable relative to the body portion 102 for selective positioning thereof between a stowed position (FIGS. 1 and 2) and a deployed position (FIGS. 4 and 5), as will be explained in further detail below.

With reference again to FIG. 1, the handle portion 114 includes a receptacle 134 sized and shaped to receive at least a portion (e.g., the distal ends) of both the first and second secondary cleaning tools 126, 130. More specifically, the first secondary cleaning tool 126 is coupled to the body portion 102 at a first pivot point 136, and the second secondary cleaning tool 130 is coupled to the body portion 102 at a second pivot point 138. Referring now to FIG. 3, the first pivot point 136 of the illustrated embodiment is defined by a first opening 140 in the body portion 102, and the second pivot point 138 is defined by a second opening 142 in the body portion 102. As will be explained in further detail below, a portion of the first secondary cleaning tool 126 and a portion of the second secondary cleaning tool 130 are insertable within the first opening 140 and the second opening 142, respectively, to facilitate engagement therebetween, and to facilitate rotation of the first secondary cleaning tool 126 and the second secondary cleaning tool 130 relative to the body portion 102.

Figure 4:
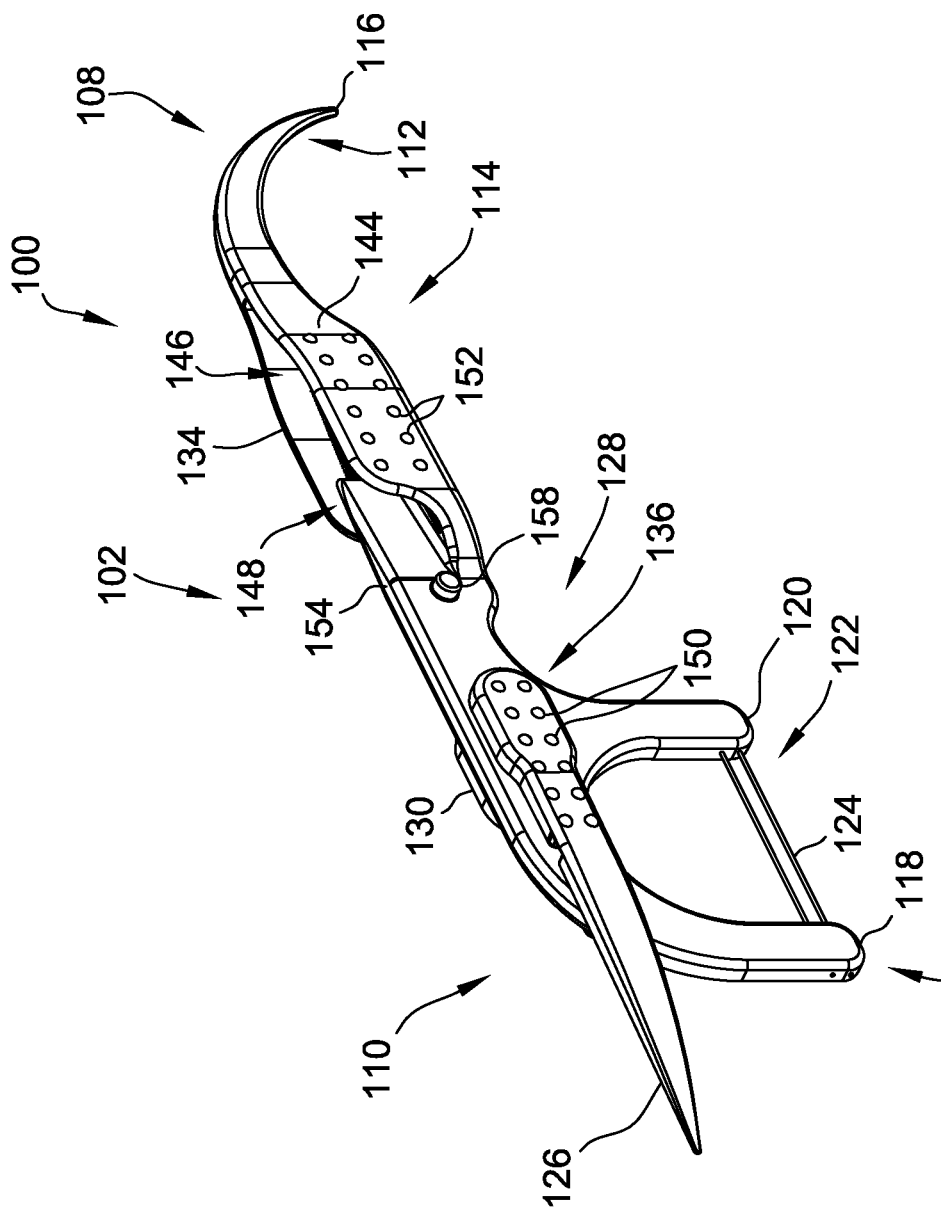
FIG. 4 is a perspective view of the dental cleaning tool shown in FIG. 1 having the first secondary cleaning tool in a deployed position and the second secondary tool in the stowed position.
Figure 5:
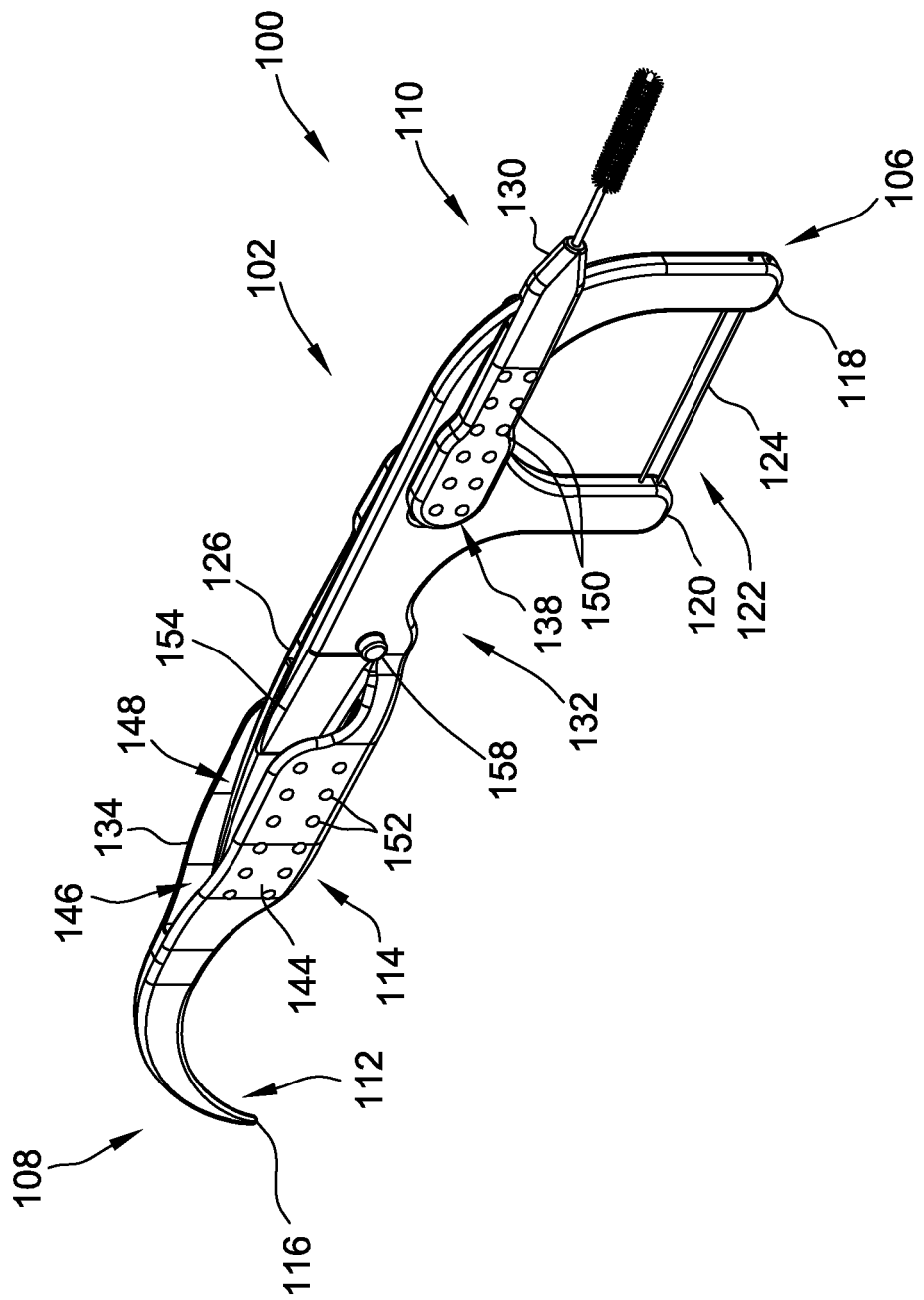
FIG. 5 is another perspective view of the dental cleaning tool shown in FIG. 1 but with the second secondary cleaning tool in the deployed position and the first secondary cleaning tool in the stowed position.

With reference still to FIG. 3, the receptacle 134 of the illustrated embodiment includes a side wall 144 oriented such that access to an interior 146 of the receptacle 134 is restricted from at least one direction. For example, the side wall 144 is spaced from the body portion 102, extends on both the first side 128 and the second side 132 of the body portion 102, and is oriented such that an opening 148 is defined in the receptacle 134. The opening 148 provides access to the receptacle 134. In the illustrated embodiment, the opening 148 provides access to the receptacle 134 from the top of the dental cleaning tool 100. Both the first and second secondary cleaning tools 126, 130 are manually rotatable for insertion into the interior 146 of the receptacle 134 through the opening 148 to the stowed position (FIGS. 1 and 2). Both the first and second secondary cleaning tools 126, 130 are further manually rotatable for selectively moving the secondary cleaning tools from the stowed position to the deployed position (FIGS. 4 and 5).

In one suitable embodiment, the receptacle 134 is enclosed such that access to the interior 146 is only provided through the opening 148. In addition, the receptacle 134 is shaped such that tips (or distal ends) of the first secondary cleaning tool 126 and the second secondary cleaning tool 130 are covered or shielded by the receptacle 134 when in the stowed position (FIGS. 1 and 2). As such, the tips of the first secondary cleaning tool 126 and the second secondary cleaning tool 130 are at least partially protected when in the stowed position.

Moreover and as illustrated in FIGS. 1 and 2, at least a portion (e.g., the proximal ends) of the first secondary cleaning tool 126 and the second secondary cleaning tool 130 are positioned exterior of the receptacle 134 when in the stowed position. As such, a user of the dental cleaning tool 100 is able to grasp, rotate, and thus deploy at least one of the first and second secondary cleaning tools 126, 130 from the stowed position. When in the deployed position, as shown in FIGS. 4 and 5, both the first secondary cleaning tool 126 and the second secondary cleaning tool 130 have a sufficiently long length such that they extend past the first end 106 of the body portion 102. As such, the first secondary cleaning tool 126 and the second secondary cleaning tool 130 are unimpeded by the floss assembly 110 or any other part of the dental cleaning tool 100 when in use.

In one suitable embodiment, the first secondary cleaning tool 126 and the second secondary cleaning tool 130 each include a plurality of gripping protrusions or nubs 150 formed thereon. The plurality of gripping protrusions 150 facilitate a user grasping either the first secondary cleaning tool 126 or the second secondary cleaning tool 130 thereby enabling a user to deploy the respective secondary cleaning tool from the stowed position, and to stow the at least one secondary cleaning tool from the deployed position. In addition, the handle portion 114 includes a plurality of gripping protrusions 152 formed thereon. The plurality of gripping protrusions 152 on the handle portion 114 of the dental cleaning tool 100 facilitates the user grasping the dental cleaning tool when in use. In other suitable embodiment, the first secondary cleaning tool 126, the second secondary cleaning tool 130, and/or the handle portion 114 including other suitable gripping features besides gripping protrusions 150, 152. In still other suitable embodiments, the first secondary cleaning tool 126, the second secondary cleaning tool 130, and/or the handle portion 114 are free of any gripping features including the gripping protrusions 150, 152 seen in FIGS. 1-5.

In the illustrated embodiment, the body portion 102 of the dental cleaning tool 100 further includes a spine member 154 extending longitudinally from the first end 106, through the interior 146 of the receptacle 134, and towards the second end 108 of the body portion 102. As shown in FIG. 2, the spine member 154 tapers and terminates within the interior 146 of the receptacle 134 such that the interior is partially partitioned on the first side 128 and the second side 132 of the body portion 102. The spine member 154 provides rigidity to the body portion 102.

Referring again to FIG. 3, the body portion 102 of the dental cleaning tool 100 further includes a first stopper tab 156 extending from the floss assembly 110, and a second stopper tab 158 extending from the handle portion 114 for each of the first secondary cleaning tool 126 and the second secondary cleaning tool 130. Thus, one first stopper tab 156 and one second stopper tab 158 is located on the first side 128 of the body portion 102, and the other first stopper tab 156 and the other second stopper tab 158 are located on the opposite, second side 132 of the body portion. In use, the first stopper tab 156 restricts rotation of the at least one secondary cleaning tool (i.e., the first secondary cleaning tool 126 or the second secondary cleaning tool 130) in a first rotational direction 160, and the second stopper tab 158 restricts rotation of the at least one secondary cleaning tool in a second rotational direction 162 opposite from the first rotational direction 160. Arrows provided in FIG. 3 illustrate the first and second rotational directions 160, 162.

In addition, the first stopper tab 156 and the second stopper tab 158 selectively engage the at least one secondary cleaning tool, and are positioned to locate the at least one secondary cleaning tool in the stowed position and the deployed position. More specifically, the first stopper tab 156 and the second stopper tab 158 are positioned such that the first secondary cleaning tool 126 and the second secondary cleaning tool 130 are aligned with the longitudinal axis 104 of the body portion 102 when in the stowed position (FIGS. 1 and 2) and the deployed position (FIGS. 4 and 5). It is contemplated, however, that the first and second stopper tabs 156 and 158 can be positioned such that the first secondary cleaning tool 126 and the second secondary cleaning tool 130 are out of alignment with the longitudinal axis 104 of the body portion 102 when in the stowed position (FIGS. 1 and 2) and/or the deployed position (FIGS. 4 and 5).

With reference to FIG. 6, the first secondary cleaning tool 126 includes a first tab groove, indicated generally at 164, and a second tab groove, indicated generally at 166, defined therein. The first tab groove 164 is configured to receive the first stopper tab 156 on the first side 128 of the body portion 102 when the first secondary cleaning tool 126 is in the deployed position, and the second tab groove 166 is adapted to receive the second stopper tab 158 on the first side 128 of the body portion 102 when the first secondary cleaning tool 126 is in the stowed position. In addition, the first tab groove 164 and the second tab groove 166 are shaped to engage the first stopper tab 156 and the second stopper tab 158 with a retaining force. For example, the first tab groove 164 and the second tab groove 166 each include a constricted opening 168 sized and shaped such that the first stopper tab 156 and the second stopper tab 158 are, respectively, frictionally insertable therein. As such, the first tab groove 164 and the second tab groove 166 engage the first stopper tab 156 and the second stopper tab 158 respectively with a retaining force to maintain the first secondary cleaning tool 126 in the stowed position or the deployed position.

Similarly, referring to FIG. 7, the second secondary cleaning tool 130 includes a first tab groove, indicated generally at 170, and a second tab groove, indicated generally at 172, defined therein. The first tab groove 170 is configured to receive the first stopper tab 156 on the second side 132 of the body portion 102 when the second secondary cleaning tool 130 is in the deployed position, and the second tab groove 172 is configured to receive the second stopper tab 158 on the second side 132 of the body portion 102 when the second secondary cleaning tool 130 is in the stowed position. In addition, the first tab groove 170 and the second tab groove 172 are sized and shaped to engage the first stopper tab 156 and the second stopper tab 158 respectively with a retaining force. For example, the first tab groove 170 and the second tab groove 172 each include a constricted opening 174 sized and shaped such that the first stopper tab 156 and the second stopper tab 158 are, respectively, frictionally insertable therein. As such, the first tab groove 170 and the second tab groove 172 engage the first stopper tab 156 and the second stopper tab 158 respectively with a retaining force to maintain the second secondary cleaning tool 130 in the stowed position or the deployed position.

As described above, a portion of the first secondary cleaning tool 126 and the second secondary cleaning tool 130 are insertable within the first opening 140 and the second opening 142 (both shown in FIG. 3) to facilitate engagement therebetween. Referring to FIGS. 6 and 7, the first secondary cleaning tool 126 and the second secondary cleaning tool 130 each include an engagement member 176 extending therefrom. The engagement member 176 is insertable within the first opening 140 and the second opening 142, and is shaped to enable free rotation of the first secondary cleaning tool 126 and the second secondary cleaning tool 130 relative to the body portion 102. In the illustrated embodiment, the first opening 140 is longitudinally offset relative to the second opening 142 and, more specifically, the first opening of the illustrated embodiment is disposed adjacent and rearward the second opening. As a result, the first secondary cleaning tool 126, which is attached at the first opening 140, is longitudinally office and rearward the second secondary cleaning tool 130, which is attached at the second opening 142.

Figure 8:
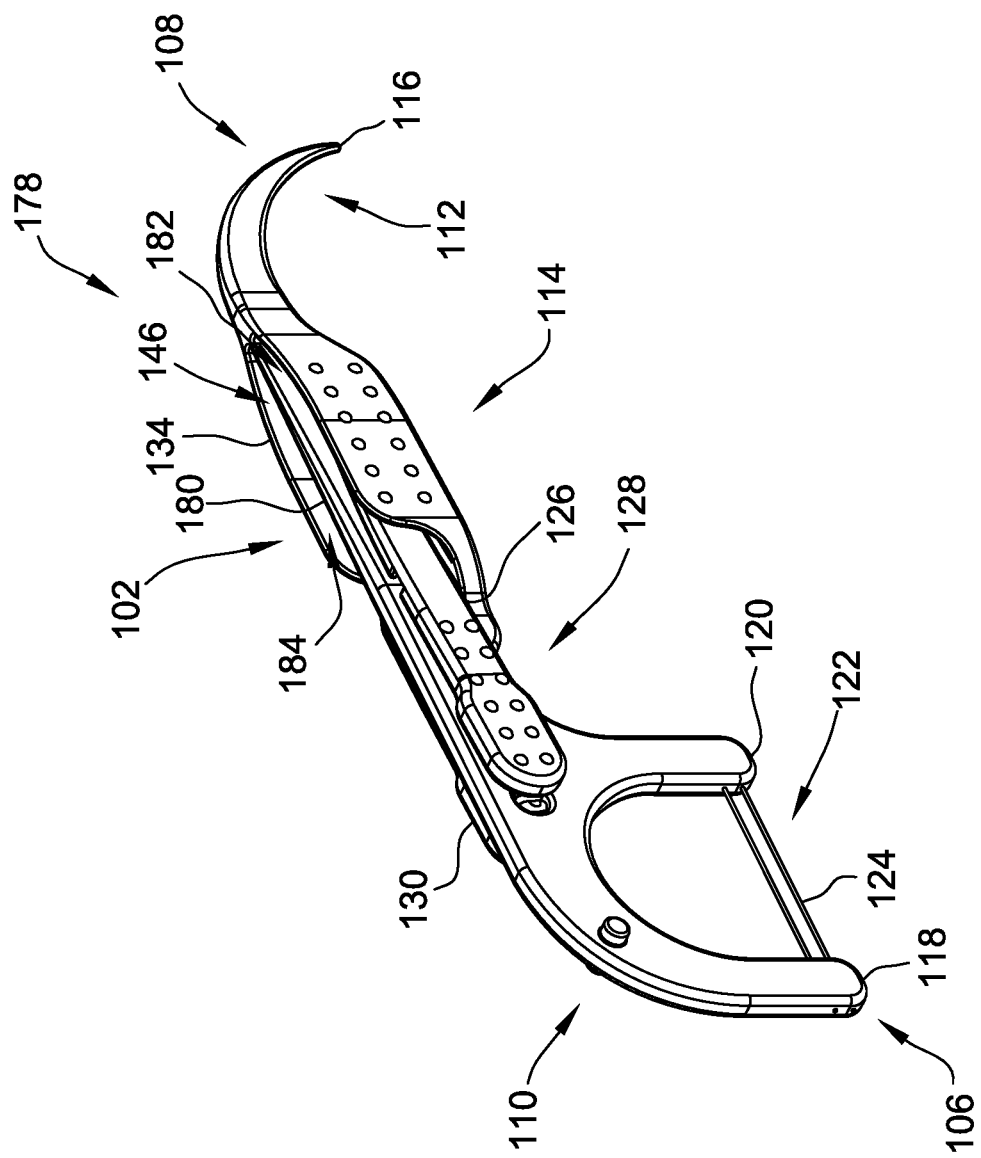
FIG. 8 is a perspective view of another suitable dental cleaning tool of the present disclosure, the dental cleaning tool having handle portion defining a shield, a first secondary cleaning tool, and second secondary cleaning tool, the first and second secondary cleaning tools being in a stowed position.
Figure 9:
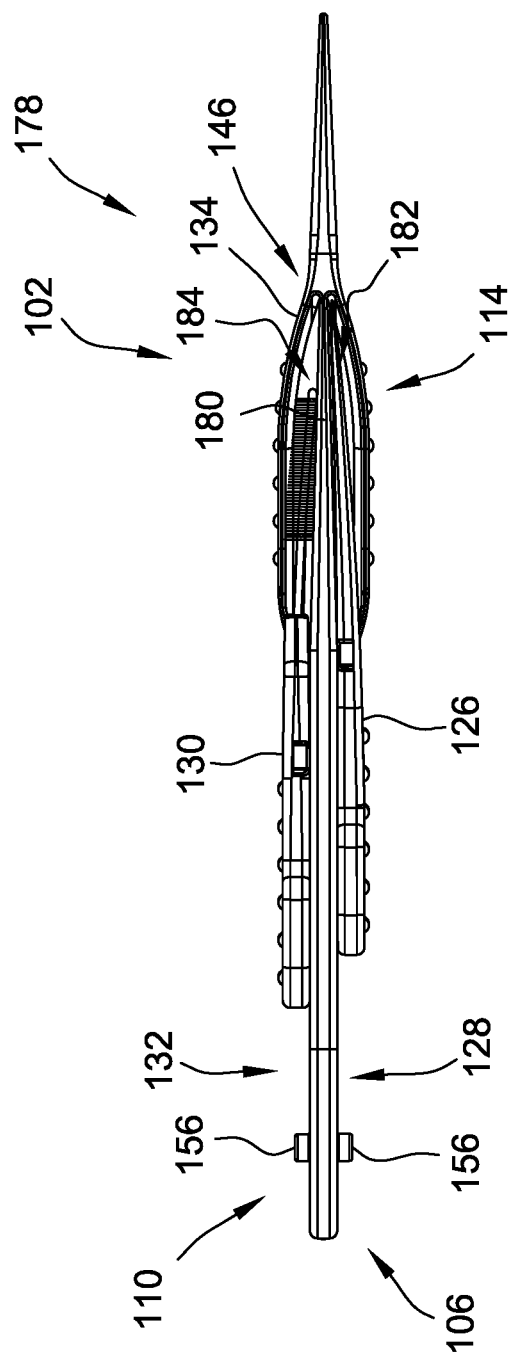
FIG. 9 is a top view of the dental cleaning tool shown in FIG. 8

FIGS. 8 and 9 illustrate another suitable embodiment of a dental cleaning tool 178 of the present disclosure. The dental cleaning tool 178 is substantially similar to the dental cleaning tool 100 shown in FIGS. 1-5 and, accordingly, like numerals are used to refer to like elements of both dental cleaning tools 100 and 178.

In the exemplary embodiment seen in FIGS. 8 and 9, the body portion 102 further includes a spine member 180 extending longitudinally from the first end 106, through the interior 146 of the receptacle 134, and towards the second end 108 of the body portion 102. As shown in FIG. 9, the spine member 180 extends towards the second end 108 such that the interior 146 of the receptacle 134 is partitioned to define a first receiving slot 182 and a second receiving slot 184 therein on opposing sides of the body portion 102. The first receiving slot 182 is sized and shaped to receive the first secondary cleaning tool 126 therein when in the stowed position, and the second receiving slot 184 is sized and shaped to receive the second secondary cleaning tool 130 therein when in the stowed position.

Figure 10:
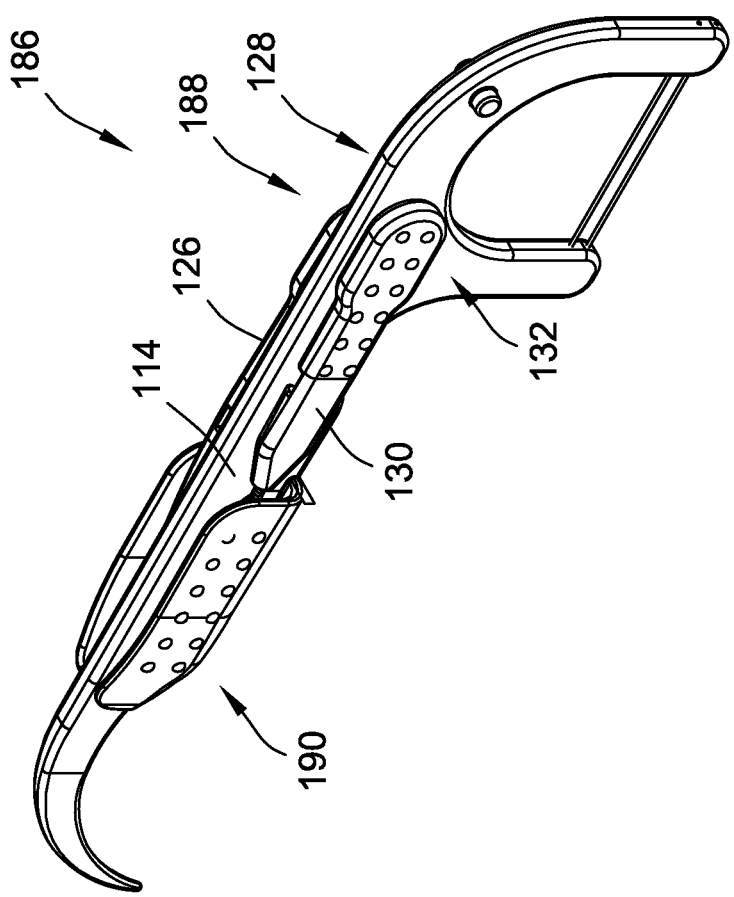
FIG. 10 is a perspective view of another suitable dental cleaning tool of the present disclosure, the dental cleaning tool having a receptacle of a handle portion defining a shield, a first secondary cleaning tool, and second secondary cleaning tool, the first and second secondary cleaning tools being in a stowed position, and the receptacle formed separately from the dental cleaning tool.
Figure 11:
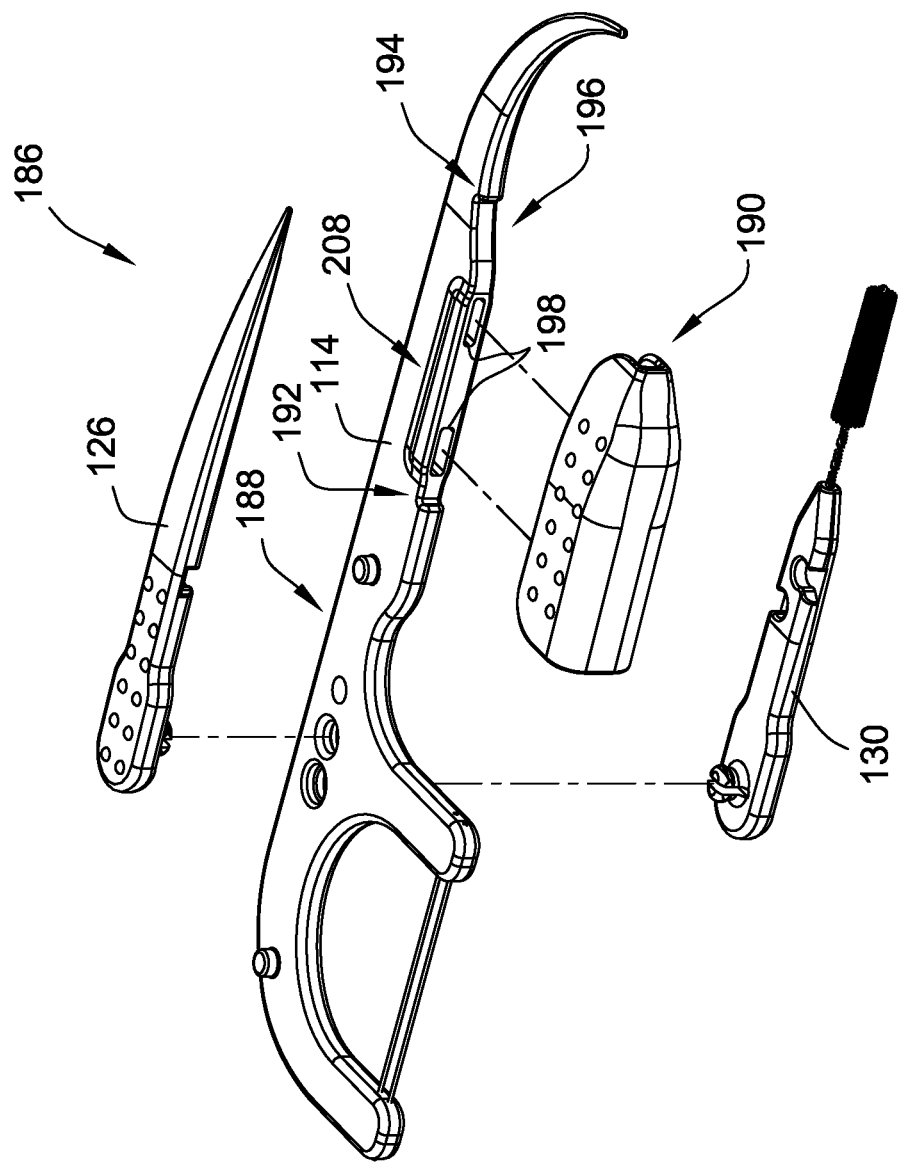
FIG. 11 is a perspective view of the dental cleaning tool shown in FIG. 10 having the receptacle, the first secondary cleaning tool, the second secondary cleaning tool, and the receptacle disassembled from the tool.
Figure 12:
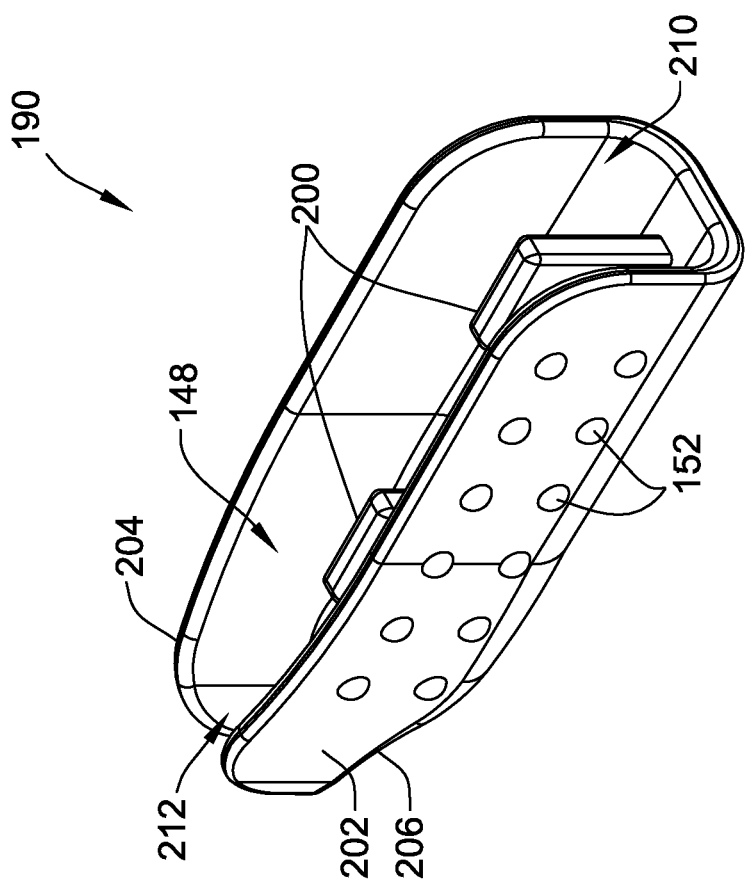
FIG. 12 is a perspective view of the receptacle shown in FIG. 11.

FIGS. 10-12 illustrate another suitable embodiment of a dental cleaning tool 186 of the present disclosure. The dental cleaning tool 186 seen in FIGS. 10-12 is substantially similar to the dental cleaning tools 100 and 178 shown in FIGS. 1-5 and 8-9 and, accordingly, like numerals are used to refer to like elements of each dental cleaning tool 100, 178, and 186.

In the exemplary embodiment seen in FIGS. 10 and 11, the dental cleaning tool 186 is an assembly including multiple components selectively coupled together to form the dental cleaning tool. For example, the dental cleaning tool 186 is formed from a body portion, indicated generally at 188, and a plurality of components formed separately from and then selectively coupled to the body portion 188. More specifically, the dental cleaning tool 186 illustrated in FIGS. 10 and 11 includes the first secondary cleaning tool 126, the second secondary cleaning tool 130, and a receptacle member, indicated generally at 190, coupled to the body portion 188. The receptacle member 190 is similar to the receptacle 134 (shown in FIG. 1) in that the receptacle member 190 and the receptacle 134 have a similar size, shape, and contour, and the receptacle member 190 also acts as a shield for, and covers, the first secondary cleaning tool 126 and the second secondary cleaning tool 130 when in the stowed position. As such, the tips of the first secondary cleaning tool 126 and the second secondary cleaning tool 130 are at least partially protected by the receptacle member 190 when in the stowed position.

With reference to FIG. 11, the body portion 188 includes the handle portion 114, which is designed to mate with the receptacle member 190 when forming the dental cleaning tool 186. In the exemplary embodiment, the handle portion 114 includes a first stepped region, indicated generally at 192, and a second stepped region, indicated generally at 194, that is positioned rearward of the first stepped region 192. The first stepped region 192 and the second stepped region 194 define an indent, indicated generally at 196, in the underside of the body portion 188. The indent 196 is sized to receive the receptacle member 190 therein when assembling the dental cleaning tool 186. More specifically, the first stepped region 192 and the second stepped region 194 are spaced from each other by a distance substantially equal to the longitudinal length of the receptacle member 190 such that the receptacle member 190 is positioned between the first stepped region 192 and the second stepped region 194 when coupled to the body portion 188. In addition, the first stepped region 192 and the second stepped region 194 are sized such that the indent 196 is recessed relative to the underside of the body portion 188 by a distance substantially equal to the thickness of the receptacle member 190. As such, the receptacle member 190 is substantially flush with the underside of the body portion 188 when coupled thereto. The first stepped region 192 and the second stepped region 194 also abut against the receptacle member 190 and facilitate restricting longitudinal movement of the receptacle member 190 relative to the body portion 188.

In one embodiment, the receptacle member 190 is matingly engaged with the body portion 188. For example, the body portion 188 further includes at least one engagement slot 198 defined on the underside of the body portion 188 within the indent 196. With reference to FIG. 12, the receptacle member 190 includes at least one engagement member 200 designed to mate with the at least one engagement slot 198 in the body portion 188. More specifically, the receptacle member 190 includes a first side wall 202, a second side wall 204, and a bottom wall 206 extending therebetween. The engagement member 200 is formed on, and extends from, the bottom wall 206. In addition, the engagement slot 198 and the engagement member 200 are adapted such that the body portion 188 and the receptacle member 190 are engaged with at least one of an interference fit or a snap fit when coupled together. It is understood that the body portion 188 and the receptacle member 190 can be engaged in any manner that enables the dental cleaning tool 186 to function as described herein. Moreover, in one embodiment, the body portion 188 includes an area 208 of increased thickness defined on the body portion 188 longitudinally between the first stepped region 192 and the second stepped region 194. The area 208 of increased thickness facilitates providing additional reinforcement to the body portion 188 proximate the space voided by the engagement slot 198, and in the area of engagement between the body portion 188 and the engagement member 200.

Referring again to FIG. 12, the first side wall 202 and the second side wall 204 are spaced from each other and oriented perpendicularly relative to the bottom wall 206 such that a front opening 210 and a rear opening 212 are defined in the receptacle member 190. The front opening 210 is sized such that a gap is defined between the first side wall 202 and the first side 128 (shown in FIG. 10) of the body portion 188, and such that a gap is defined between the second side wall 204 and the second side 132 (shown in FIG. 10) of the body portion 188 when the receptacle member 190 is coupled to the body portion 188. The gaps enable the first secondary cleaning tool 126 and the second secondary cleaning tool 130 to be stowed within an interior of the receptacle member 190 when in the stowed position. The rear opening 212 is sized to receive the body portion 188 therethrough when the receptacle member 190 is slid over the handle portion 114 of the body portion 188. In one embodiment, the rear opening 212 is sized such that the first side wall 202 and the second side wall 204 abut the body portion 188 with an interference fit when the receptacle member 190 is coupled to the body portion 188. As such, the interior of the receptacle member 190 is at least partially sealed from the rearward direction, thereby facilitating shielding of the first secondary cleaning tool 126 and the second secondary cleaning tool 130 when in the stowed position.

Figure 13:
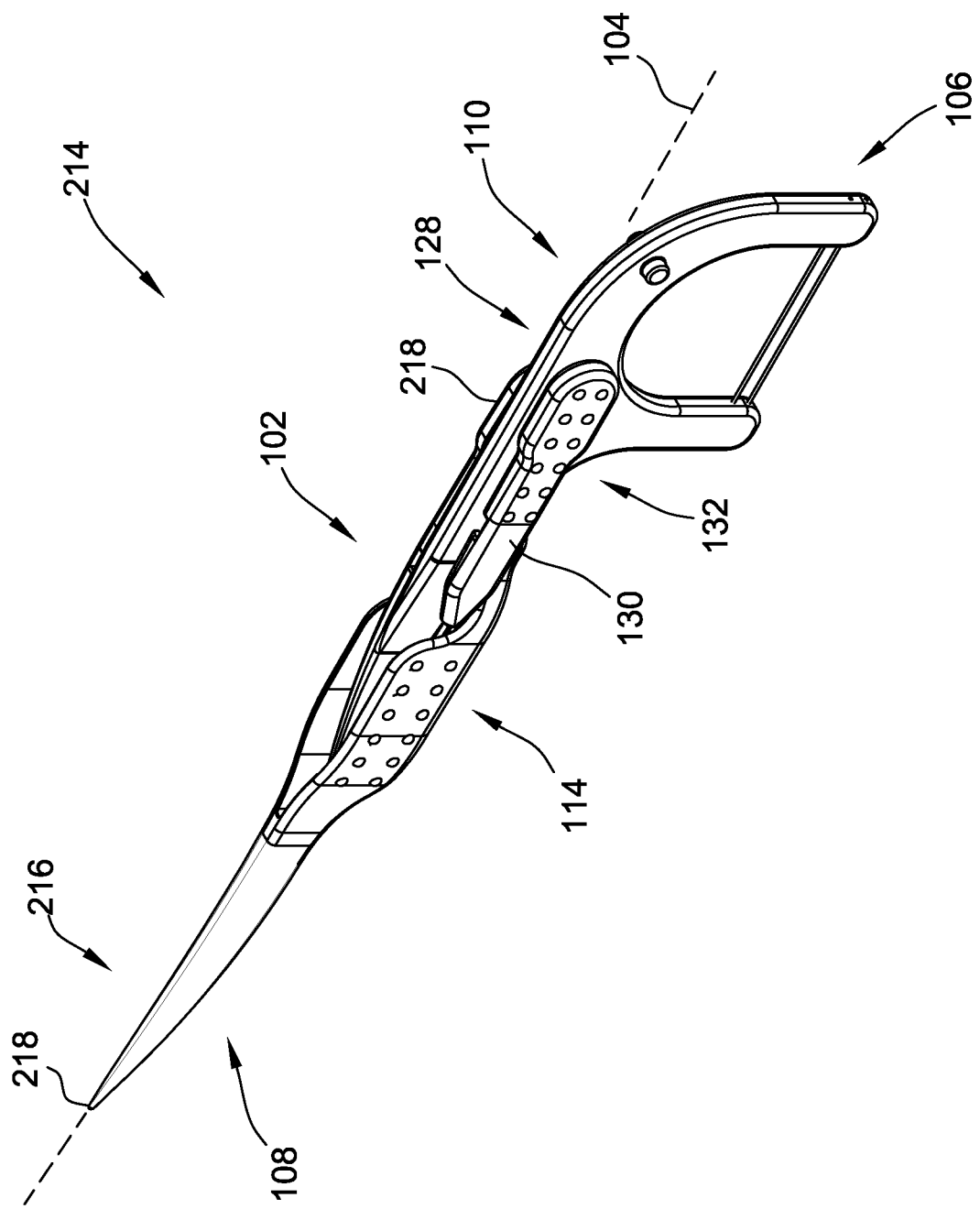
FIG. 13 is a perspective view of another suitable dental cleaning tool of the present disclosure, the dental cleaning tool have handle portion defining a shield, a first secondary cleaning tool, and a second secondary cleaning tool, and the first and second secondary cleaning tools being in a stowed position.
Figure 14:
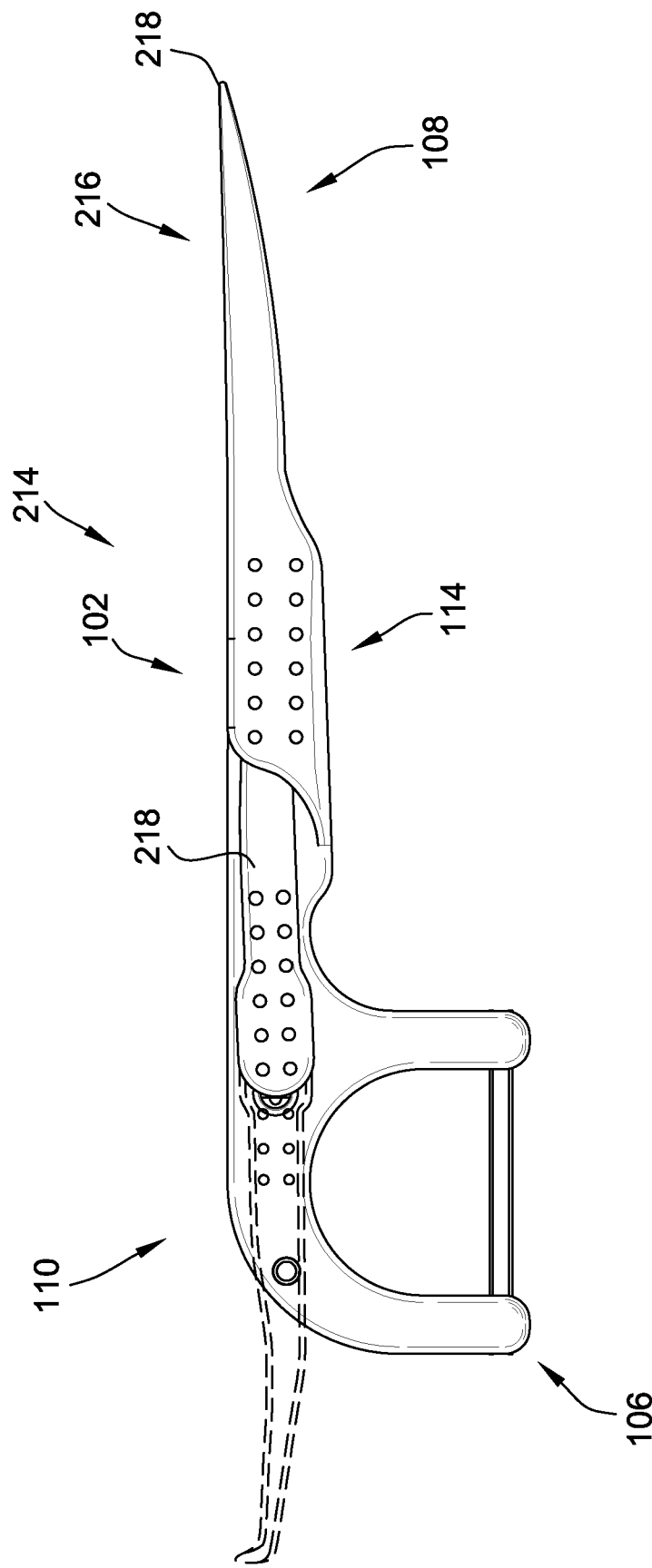
FIG. 14 is a side view of the dental cleaning tool shown in FIG. 13, the second secondary cleaning tool being in a stowed position, and the second secondary cleaning tool being shown in a deployed position in phantom lines.
Figure 15:
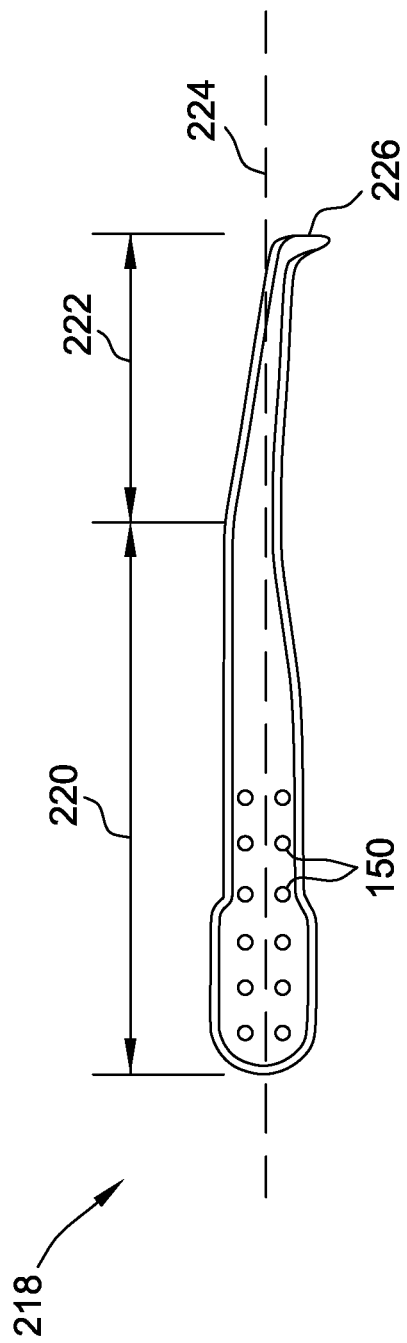
FIG. 15 is a side view of the second secondary cleaning tool shown in FIG. 13.

FIGS. 13-15 illustrate another suitable embodiment of a dental cleaning tool 214 of the present disclosure. The dental cleaning tool 000 is substantially similar to the dental cleaning tool 100 shown in FIGS. 1-5 and, accordingly, like numerals are used to refer to like elements of both dental cleaning tools 100 and 214.

In the exemplary embodiment seen in FIGS. 10-12, the dental cleaning tool 214 includes the body portion 102, the floss assembly 110 formed at the first end 106 of the body portion 102, a toothpick member, indicated generally at 216, formed at the second end 108 of the body portion 102, and the handle portion 114 extending between the floss assembly 110 and the toothpick member 216. In the exemplary embodiment, the body portion 102 is tapered such that the toothpick member 216 includes a pointed tip 218 at the second end 108 of the body portion. Moreover, the toothpick member 216 is oriented in generally co-axial alignment with the longitudinal axis 104 of the body portion 102. The toothpick member 216 is configured to facilitate removing or loosening food remnants or other debris from hard-to-reach locations within the user's mouth (e.g., between user's teeth).

As seen in FIGS. 13 and 14, the dental cleaning tool 214 also includes at least one secondary cleaning tool coupled to the body portion 102. More specifically, the dental cleaning tool 214 illustrated in the accompanying drawings includes a first secondary cleaning tool 130 coupled on the second side 132 of the body portion 102, and a second secondary cleaning tool 218 coupled on the first side 128 of the body portion 102. The first and second secondary cleaning tools 130, 218 can be any suitable dental cleaning instruments that enable the dental cleaning tool 214 to function as described herein. In one suitable embodiment, the first secondary cleaning tool 130 is a bristled cleaning member, and the second secondary cleaning tool 218 is a secondary toothpick member. The first and second secondary cleaning tools 130, 218 are rotatable relative to the body portion 102 for selective positioning thereof between a stowed position (FIG. 13) and a deployed position (FIG. 14).

Referring to FIG. 15, the second secondary cleaning tool 218 includes a first portion 220 and a second portion 222. The first portion 220 is generally co-axially aligned with a longitudinal axis 224 of the second secondary cleaning tool 218, and the second portion 222 is oriented obliquely relative to the longitudinal axis 224. In addition, the second portion 222 has a tip end 226 extending therefrom. The tip end 226 is oriented substantially perpendicularly relative to the longitudinal axis 224 and, when the second secondary cleaning tool 218 is in the deployed position (FIG. 14), is also oriented substantially perpendicularly relative to the longitudinal axis 104 of the body portion 102. The second secondary cleaning tool 218 is configured to facilitate removing or loosening food remnants or other debris from hard-to-reach locations within the user's mouth (e.g., between user's teeth).

The dental cleaning tools 100, 178, 186 and/or 214 may be formed in any suitable manner and of any suitable material. For example, the dental cleaning tools 100, 178, 186 and/or 214 may be formed from metal, wood, plastic, and/or combinations thereof. In one preferred embodiment, the dental cleaning tools 100, 178, 186 and/or 214 are molded or otherwise formed from resilient synthetic material, such as, but not limited to, plastic or metal.

The dental cleaning tool described herein includes a handle that also functions as a shield for at least one secondary cleaning tool of the dental cleaning tool. The handle includes a receptacle sized to receive the at least one secondary cleaning tool therein when in a stowed position. The at least one secondary cleaning tool is freely rotatable relative to a body portion of the dental cleaning tool such that it is selectively positioned between a stowed position, within the receptacle, and a deployed position. Stopper tabs are formed on the body portion, and the stopper tabs engage the at least one secondary cleaning tool to retain the secondary cleaning tool in the stowed position and the deployed position. As such, the secondary cleaning tool is restricted from unintentionally being deployed from the stowed position, or from being unintentionally stowed from the deployed position. Moreover, when in the stowed position, the secondary cleaning tool is substantially flush with the handle such that use of a floss assembly of the dental cleaning tool remains unimpeded.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the disclosure, it is intended that all matter contained in the above description and shown in the accompanying drawings shall be interpreted as illustrative and not in a limiting sense.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dental cleaning tool comprising:
   a body portion defining a longitudinal axis of the dental cleaning tool, the body portion extending from a first end to a second end along the longitudinal axis, wherein the body portion comprises:
      a handle portion having a distal end, a proximal end, opposing first and second sides, and opposing upper and lower sides disposed between the first and second sides, the handle portion comprising a receptacle;
      a floss assembly coupled to the proximal end of the handle portion, the floss assembly comprising a bridge segment, first and second arms extending transversely from the bridge segment, and a floss extending between free ends of the first and second arms, wherein the bridge segment has an upper side continuously with and immediately adjacent the upper side of the handle portion, and wherein the longitudinal axis extends between the distal and proximal ends of the handle portion and through the bridge segment; and a toothpick member coupled to the distal end of the handle portion; and at least one secondary cleaning tool coupled to the body portion, wherein the at least one secondary cleaning tool is movable relative to the body portion for selectively positioning the at least one secondary cleaning tool between a stowed position, within the receptacle, and a deployed position, wherein the body portion further comprises a stopper tab extending from the bridge segment of the floss assembly and configured to restrict movement of the at least one secondary cleaning tool in the deployed position.

2. The dental cleaning tool in accordance with claim 1, wherein the receptacle comprises a side wall oriented to restrict access to an interior of the receptacle from at least one direction.

3. The dental cleaning tool in accordance with claim 2, wherein an opening is defined in the receptacle, and wherein the at least one secondary cleaning tool is movable for insertion into the interior of the receptacle through the opening.

4. The dental cleaning tool in accordance with claim 1, wherein
the stopper tab positioned on the bridge segment of the floss assembly is a first stopper tab and the body portion further comprises
a second stopper tab positioned on the handle portion, the at least one secondary cleaning tool being coupled to the handle portion at a pivot point positioned between the first stopper tab and the second stopper tab and pivotable between the first stopper tab and the second stopper tab, and the pivot point, the first stop tab, and the second stopper tab being positioned along the longitudinal axis.

5. The dental cleaning tool in accordance with claim 4, wherein the at least one secondary cleaning tool comprises:
a first tab groove configured to receive the first stopper tab when the at least one secondary cleaning tool is in the deployed position; and
a second tab groove configured to receive the second stopper tab when the at least one secondary cleaning tool is in the stowed position.

6. The dental cleaning tool in accordance with claim 5, wherein the first tab groove and the second tab groove are adapted to engage the first stopper tab and the second stopper tab respectively with a retaining force.

7. The dental cleaning tool in accordance with claim 4, wherein the first stopper tab and the second stopper tab are positioned to locate the at least one secondary cleaning tool in the stowed position and the deployed position.

8. The dental cleaning tool in accordance with claim 7, wherein the first stopper tab and the second stopper tab are positioned such that the at least one secondary cleaning tool is aligned with the longitudinal axis of the body portion when in the stowed position and the deployed position.

9. The dental cleaning tool in accordance with claim 1, wherein the at least one secondary cleaning tool is coupled to the body portion at a pivot point positioned between the stopper tab and the receptacle, and pivotable between the stopper tab and the receptacle, the pivot point, the stop tab, and the receptacle being positioned along the longitudinal axis.

10. A dental cleaning tool comprising:
a body portion defining a longitudinal axis of the dental cleaning tool, the body portion extending from a first end to a second end along the longitudinal axis, wherein the body portion comprises:
a handle portion having a distal end, a proximal end, opposing first and second sides, and opposing upper and lower sides disposed between the first and second sides, the handle portion comprising a receptacle;
a floss assembly coupled to the proximal end of the handle portion, the floss assembly comprising a bridge segment, first and second arms extending transversely from the bridge segment, and a floss extending between free ends of the first and second arms, wherein the bridge segment has an upper side continuously with and immediately adjacent the upper side of the handle portion, and wherein the longitudinal axis extends between the distal and proximal ends of the handle portion and through the bridge segment;
a toothpick member coupled to the distal end of the handle portion;
a spine member extending within an interior of the receptacle, wherein the spine member terminates within the interior; and
at least one secondary cleaning tool coupled to the body portion, wherein the at least one secondary cleaning tool is movable relative to the body portion for selectively positioning the at least one secondary cleaning tool between a stowed position, within the receptacle, and a deployed position,
wherein a stopper tab extending from the bridge segment of the floss assembly and configured to restrict movement of the at least one secondary cleaning tool in the deployed position.

11. The dental cleaning tool in accordance with claim 10, wherein the handle portion comprises a plurality of gripping protrusions formed thereon.

12. The dental cleaning tool in accordance with claim 10, wherein the at least one secondary cleaning tool comprises a plurality of gripping protrusions formed thereon.

13. The dental cleaning tool in accordance with claim 10, wherein the body portion comprises a first side and a second side opposing the first side, and wherein the at least one secondary cleaning tool comprises a first secondary cleaning tool coupled on the first side of the body portion, and a second secondary cleaning tool coupled on the second side of the body portion.

14. The dental cleaning tool in accordance with claim 10, wherein the at least one secondary cleaning tool is coupled to the body portion at a pivot point positioned between the stopper tab and the receptacle, and pivotable between the stopper tab and the receptacle, the pivot point, the stop tab, and the receptacle being positioned along the longitudinal axis.

15. A dental cleaning tool comprising:
a body portion defining a longitudinal axis of the dental cleaning tool, the body portion extending from a first end to a second end along the longitudinal axis, wherein the body portion comprises:
a handle portion having a distal end, a proximal end, opposing first and second sides, and opposing upper and lower sides disposed between the first and second sides, the handle portion comprising a receptacle;
a floss assembly coupled to the proximal end of the handle portion, the floss assembly comprising a bridge segment, first and second arms extending transversely from the bridge segment, and a floss extending between free ends of the first and second arms, wherein the bridge segment has an upper side continuously with and immediately adjacent the upper side of the handle portion, and wherein the longitudinal axis extends between the distal and proximal ends of the handle portion and through the bridge segment;

a toothpick member coupled to the distal end of the handle portion;

a spine member extending within an interior of the receptacle, wherein the spine member is configured to partition the interior such that a first receiving slot and a second receiving slot are defined therein; and at least one secondary cleaning tool coupled to the body portion, wherein the at least one secondary cleaning tool is movable relative to the body portion for selectively positioning the at least one secondary cleaning tool between a stowed position, within at least one of the first receiving slot and the second receiving slot, and a deployed position, wherein a stopper tab extending from the bridge segment of the floss assembly and configured to restrict movement of the at least one secondary cleaning tool in the deployed position.

16. The dental cleaning tool in accordance with claim 15, wherein the toothpick member extends arcuately relative to the longitudinal axis of the body portion.

17. The dental cleaning tool in accordance with claim 15, wherein the at least one secondary cleaning tool has a length such that the at least one secondary cleaning tool extends past the first end of the body portion when in the deployed position.

18. The dental cleaning tool in accordance with claim 15, wherein the at least one secondary cleaning tool comprises a bristled cleaning member.

19. The dental cleaning tool in accordance with claim 15, wherein the at least one secondary cleaning tool comprises a secondary toothpick member.

20. The dental cleaning tool in accordance with claim 15, wherein the at least one secondary cleaning tool is coupled to the body portion at a pivot point positioned between the stopper tab and the receptacle, and pivotable between the stopper tab and the receptacle, the pivot point, the stop tab, and the receptacle being positioned along the longitudinal axis.

* * * * *